US012011960B2

(12) United States Patent
Walls

(10) Patent No.: US 12,011,960 B2
(45) Date of Patent: Jun. 18, 2024

(54) KINETIC ENERGY SHOCK ABSORBER

(71) Applicant: Francis Walls, North Little Rock, AR (US)

(72) Inventor: Francis Walls, North Little Rock, AR (US)

( * ) Notice: Subject to any disclaimer, the term of this patent is extended or adjusted under 35 U.S.C. 154(b) by 0 days.

(21) Appl. No.: 17/177,727

(22) Filed: Feb. 17, 2021

(65) Prior Publication Data
US 2022/0258554 A1 Aug. 18, 2022

(51) Int. Cl.
*B60G 15/06* (2006.01)
*B60G 11/58* (2006.01)

(52) U.S. Cl.
CPC ............ *B60G 11/58* (2013.01); *B60G 15/062* (2013.01); *B60G 2300/60* (2013.01); *B60G 2401/10* (2013.01)

(58) Field of Classification Search
CPC . F03G 7/08; F03G 7/081; F03G 7/083; F03G 7/085; F03G 7/087; B60G 11/58
See application file for complete search history.

(56) References Cited

U.S. PATENT DOCUMENTS

| | | | |
|---|---|---|---|
| 4,032,829 A | 6/1977 | Schenavar | |
| 4,387,781 A | 6/1983 | Ezell et al. | |
| 8,283,795 B2 | 10/2012 | Khoury et al. | |
| 8,376,100 B2 | 2/2013 | Avadhany et al. | |
| 10,583,707 B2 * | 3/2020 | Kaskowicz | F03B 13/00 |
| 10,723,193 B2 * | 7/2020 | Kaskowicz | F03B 1/00 |
| 10,889,186 B2 * | 1/2021 | Schutt | H02J 7/025 |
| 11,161,421 B2 * | 11/2021 | Wang | B60L 53/12 |
| 11,203,242 B2 * | 12/2021 | Kaskowicz | F15B 1/027 |
| 2003/0083611 A1 * | 5/2003 | Angel | A61M 5/30 604/68 |
| 2008/0257626 A1 * | 10/2008 | Carabelli | B60G 13/14 180/165 |
| 2010/0006362 A1 | 1/2010 | Armstrong | |

(Continued)

FOREIGN PATENT DOCUMENTS

| | | | | |
|---|---|---|---|---|
| CN | 107351696 A | * | 11/2017 | |
| CN | 108298474 A | * | 7/2018 | ........... B66F 9/22 |

(Continued)

OTHER PUBLICATIONS

CN107351696A machine translation from espacenet.com (Year: 2023).*

*Primary Examiner* — Amy R Weisberg
*Assistant Examiner* — Maxwell L Meshaka
(74) *Attorney, Agent, or Firm* — Boudwin Intellectual Property Law, LLC; Daniel Boudwin

(57) ABSTRACT

A kinetic energy shock absorber is shown and described. The kinetic energy shock absorber is comprised of a sleeve that has a first closed end and a second opened end. A piston is sized to fit within the sleeve and has at least one dosed end. The closed end of the sleeve has a protrusion attached to the closed end, wherein the protrusion has an aperture located therethrough. The dosed end of the piston has a protrusion, wherein the protrusion has an aperture therein. The piston will create electric energy when it enters the sleeve via an electric generation device. The kinetic energy shock absorber is a device that may be attached to an existing vehicle shock. The kinetic, energy shock absorber may also be used as a replacement shock for a motor vehicle.

5 Claims, 4 Drawing Sheets

(56) References Cited

U.S. PATENT DOCUMENTS

| | | | |
|---|---|---|---|
| 2011/0084503 A1* | 4/2011 | Li | B60G 17/019 |
| | | | 290/1 R |
| 2012/0133334 A1 | 5/2012 | Lachenmeier et al. | |
| 2012/0146339 A1 | 6/2012 | Lee | |
| 2012/0313575 A1* | 12/2012 | Stansbury, III | B60G 17/021 |
| | | | 320/137 |
| 2020/0198428 A1* | 6/2020 | Kaskowicz | F03G 7/08 |
| 2020/0324601 A1* | 10/2020 | Kaskowicz | F03G 7/00 |

FOREIGN PATENT DOCUMENTS

| | | | | |
|---|---|---|---|---|
| CN | 208279268 U | * | 12/2018 | B66F 9/22 |
| CN | 113404748 A | * | 9/2021 | |
| CN | 214743136 U | * | 11/2021 | |
| KR | 101320110 B1 | * | 10/2013 | F03G 7/08 |
| WO | WO-2009137580 A2 | * | 11/2009 | B60G 11/58 |
| WO | WO-2010134764 A2 | * | 11/2010 | F03G 3/00 |

\* cited by examiner

KINETIC ENERGY SHOCK ABSORBER

BACKGROUND OF THE INVENTION

The present invention relates to an electric generator. More particularly, the present invention provides an electric energy generator that uses kinetic energy.

Electricity is becoming a major source of energy for vehicles. Electric vehicles store energy in battery banks. The battery banks are used to power the motors which generate motion at the tires. Typically, a battery bank lasts for a few hundred miles. However, battery banks may take some time to charge.

As battery banks may take a long time to charge these cars create a drawback. Many individuals have tried to expand the amount of charge that a battery bank can hold. However, the larger the battery bank, the heavier the vehicle. This means that more power is then needed to move the vehicle. In some instances, electric cars create energy which is lost. Energy may be lost in the form of breaking or simply in rotational energy which is not capitalized upon. This energy has the potential to be turned into electrical energy.

Consequently, there is a need for an improvement in the art of electric generation. The present invention substantially diverges in design elements from the known art while at the same time solves a problem many people face when looking for ways to increase the battery charge in an electric, vehicle. In this regard the present invention substantially fulfills these needs.

SUMMARY OF THE INVENTION

The present invention provides a kinetic energy shock absorber wherein the same can be utilized for providing convenience for the user when using an electric car. The kinetic energy shock absorber is comprised of a sleeve has a first dosed end and a second open end. A piston sized to fit within the sleeve has at least one closed end. The closed end of the sleeve has a protrusion attached to the closed end, wherein the protrusion has an aperture located therethrough. The closed end of the piston has a protrusion, wherein the protrusion has an aperture therein. The piston will create electric energy when it enters the sleeve via an electric generation device.

Another object of the kinetic energy shock absorber is to secure to the existing shock of a motor vehicle such that the entire shock will not have to be changed.

Another object of the kinetic energy shock absorber is to have a spring located about the exterior of the sleeve and the piston, wherein the spring will provide resistance.

Another object of the kinetic energy shock absorber is to have the electric generation device include copper wiring that lines the interior of the sleeve.

Another object of the kinetic energy shock absorber is to have the electric generation device is a piezoelectric device.

Another object of the kinetic energy shock absorber is to have an electric coupling located on the exterior of the sleeve, wherein the electric coupling is attached to the electric generation device.

Another object of the kinetic energy shock absorber is to have a voltage regulator electrically coupled to the electric generation device.

Another object of the kinetic energy shock absorber is to have the electric generation device is electrically coupled to a battery bank of a motor vehicle.

Another object of the kinetic energy shock absorber is to have the sleeve and the piston create an air shock.

Other objects, features and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
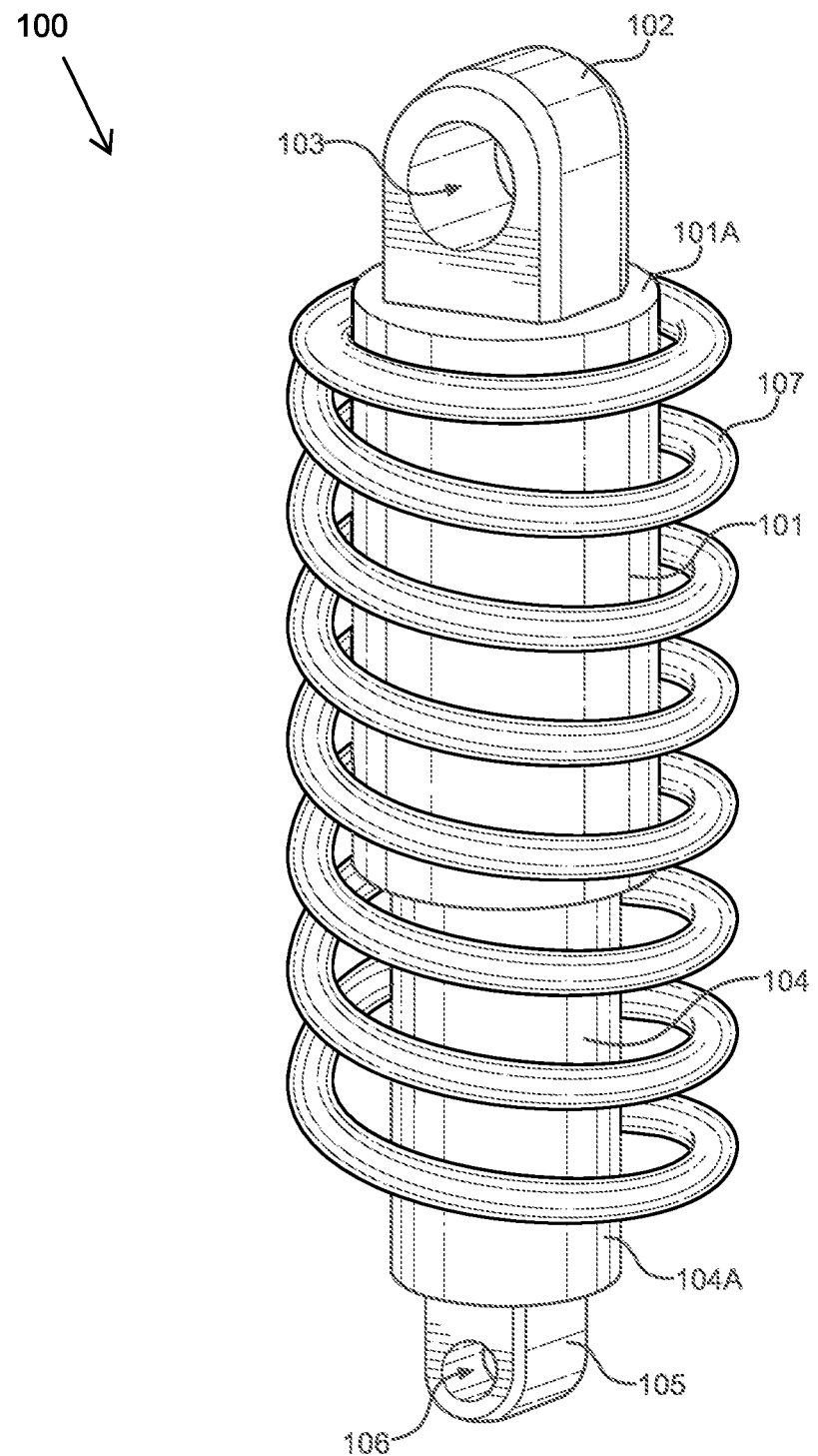
FIG. 1 shows a perspective view of an embodiment of a kinetic energy shock absorber.

Reference is made herein to the attached drawings. Like reference numerals are used throughout the drawings to depict like or similar elements of the kinetic energy shock absorber. For the purposes of presenting a brief and clear description of the present invention, a preferred embodiment will be discussed as used for the kinetic energy shock absorber. The figures are intended for representative purposes only and should not be considered to be limiting in any respect.

Referring now to FIG. 1, there is shown a perspective view of an embodiment of a kinetic energy shock absorber 100. The kinetic energy shock absorber 100 includes a cylindrical housing. The cylindrical housing is comprised of a sleeve 101. The sleeve 101 has an open end and a closed top end 101A. In one embodiment, the closed top end 101A of the sleeve 101 has a first protrusion 102 thereon. The first protrusion 102 has an aperture 103 located therethrough. The aperture 103 will allow a fastener to be used to secure the sleeve 101 to a vehicle.

The cylindrical housing is further comprised of a piston 104. The piston 104 has a top and a bottom 104A. In one embodiment, the bottom 104A has a second protrusion 105 thereon. The second protrusion 105 has an aperture 106 located therethrough. The aperture 106 will allow a fastener to be used to secure the piston 104 to a vehicle.

In some embodiments, the kinetic energy shock absorber 100 replaces the existing shocks of a vehicle. In one embodiment, the kinetic energy shock absorber 100 is a spring shock. In this embodiment, at least one coil spring 107 is secured around the sleeve 101 and the piston 104. The coil spring 107 will compress and expend as a typical coil shock. In other embodiments, multiple coil springs 107 are used to add different shock absorbing effects.

Figure 2:
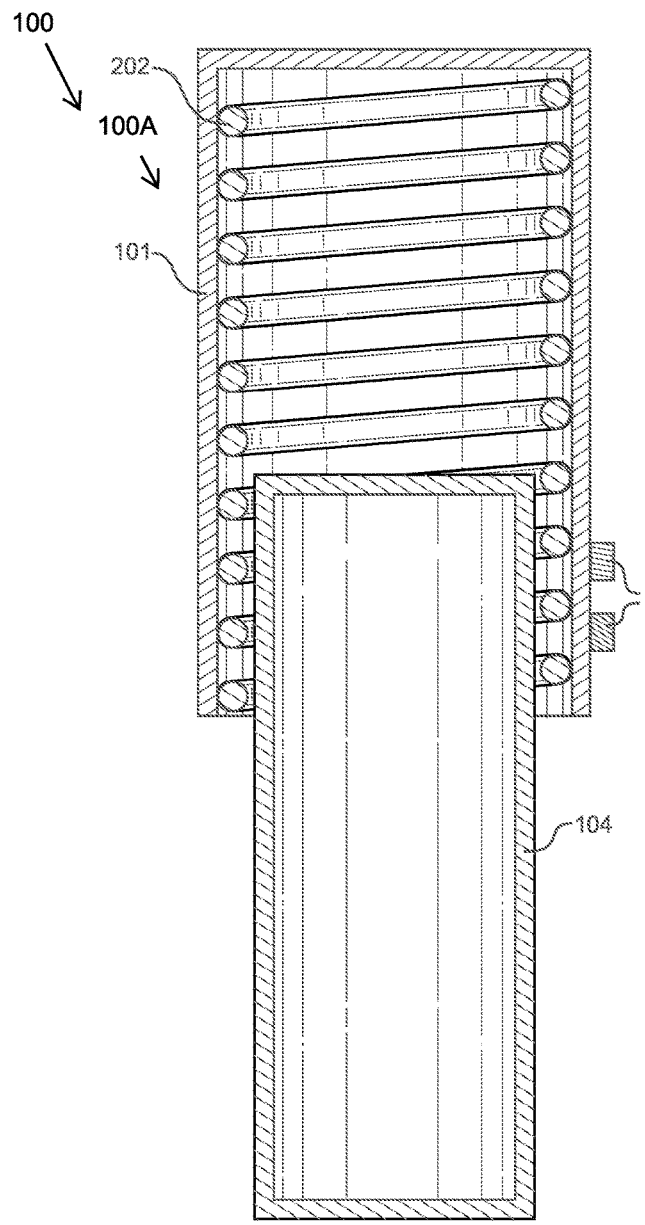
FIG. 2 shows a cross-sectional view of an embodiment of the kinetic energy shock absorber.

Referring now to FIG. 2, there is shown a cross-sectional view of an embodiment of the kinetic energy shock absorber 100. The kinetic energy shock absorber 100 has an electric energy generator located on the inside of the cylindrical housing. In one embodiment, the electric energy generator is comprised of a copper wire 202 and a magnetically charged element. In one embodiment, the copper wire 202 is wound around the interior of the sleeve 101. This will create a copper wire lining. The kinetic energy shock absorber 100 is a monotube shock absorber 100A.

In the shown embodiment, the magnetically charged element is the piston 104. In another embodiment, the piston 104 includes magnets attached thereto. When the piston 104 enters the sleeve 101 the magnetically charged element will generate electric current.

In the shown embodiment there is an electrical connection 203 located on the exterior of the sleeve 101. The copper wire 202 is connected to the electrical connection 203. This will allow for the electric current to be transferred from the electrical energy generator to the vehicle described in FIG. 4.

Figure 3:
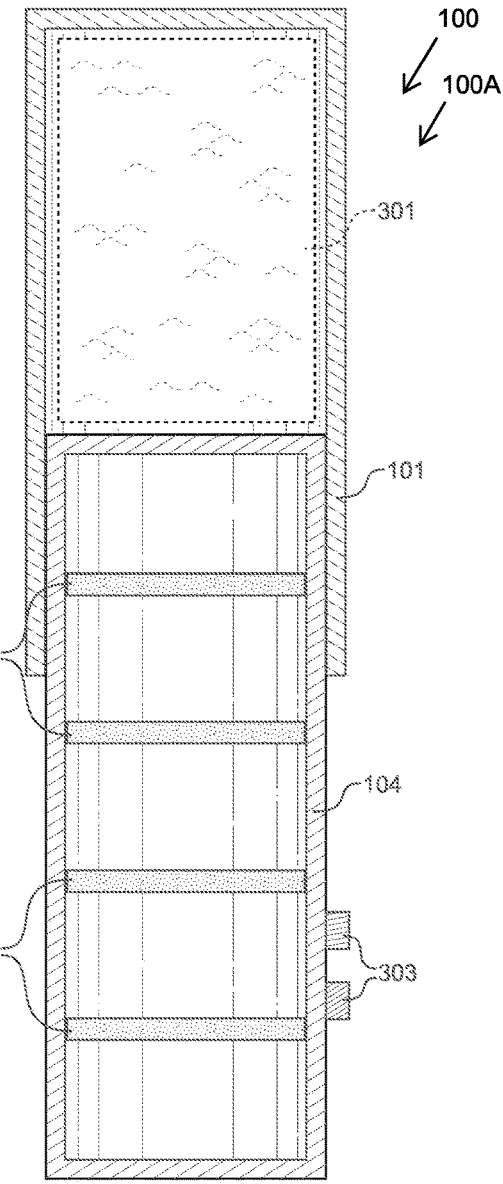
FIG. 3 shows a cross-sectional view of an embodiment of the kinetic energy shock absorber with piezoelectric elements.

Referring now to FIG. 3, there is shown a cross-sectional view of an embodiment of the kinetic energy shock absorber with piezoelectric elements. In one embodiment the kinetic energy shock absorber is an air shock. In this embodiment the sleeve 101 and the piston 104 form an air tight seal. Pressurized air 301 is trapped in a space between the piston 104 and the interior of the sleeve 101. When the piston 104 is compressed, the air 301 will compress absorbing the shock of the vehicle. The kinetic energy shock absorber 100 is a monotube shock absorber 100A.

In the shown embodiment, the electric generation element is comprised of at least one piezoelectric element 302. Piezoelectric elements 302 generate electric current via movement. In the shown embodiment, piezoelectric elements 302 comprise discs that are located within the piston 104. As the piston 104 moves the piezoelectric elements 302 will move, thereby generating an electric current.

The piston 104 has an electrical connection 303 secured thereto. The electrical connection 303 will secure to the piezoelectric elements 302 allowing the energy generated to transfer to the electrical connection 303. From there the electrical energy will be passed on to the vehicle as described in FIG. 4.

Figure 4:
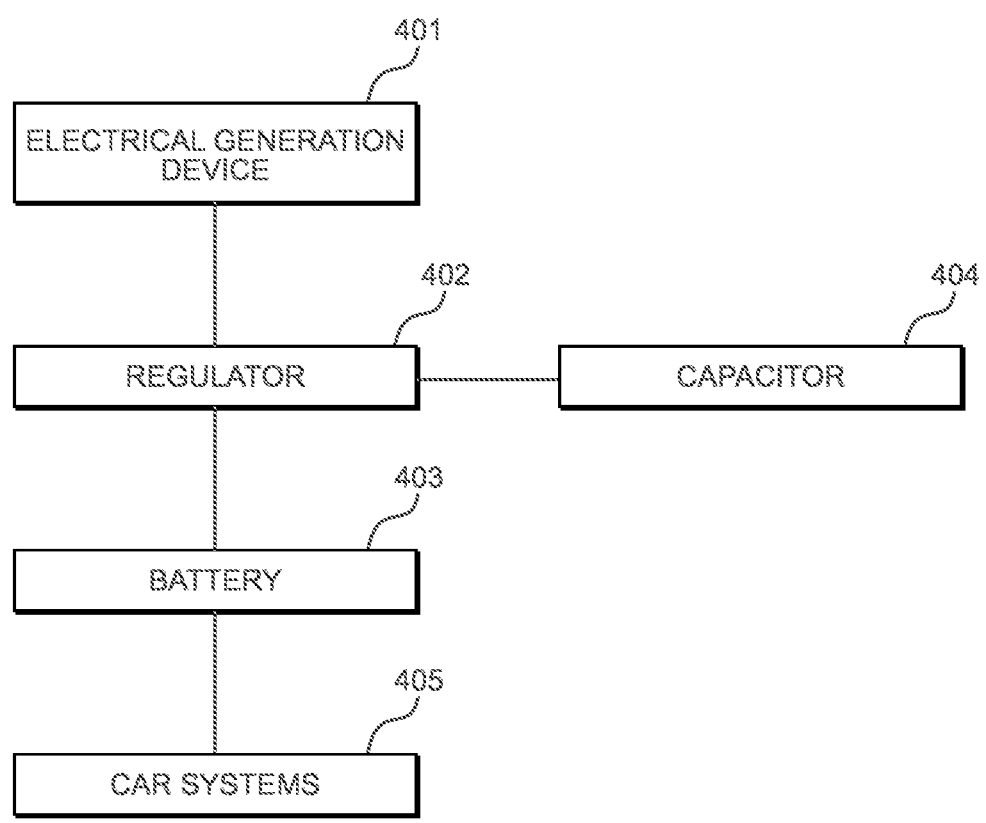
FIG. 4 shows a wiring diagram of an embodiment of the kinetic energy shock absorber.

Referring now to FIG. 4, there is shown a wiring diagram of an embodiment of the kinetic energy shock absorber. In one embodiment, the electrical generation device 401 will generate electricity. The electrical generation device has been described above in FIG. 2 and FIG. 3. Using the electrical connections as described above, the electrical generation device 401 will be electrically coupled to a regulator 402.

The regulator 402 will measure the energy output of the electrical generation device 401. The regulator 402 is electrically coupled to a vehicle battery 403. In one embodiment, the vehicle battery 403 is a battery bank of an electric vehicle. In one embodiment, the regulator 402 will ensure that to much electrical energy is not transferred directly to the vehicle battery 403. In one embodiment, the regulator 402 will ground the additional energy that the vehicle battery 403 cannot store. This does not mean that the electrical generation device 401 will necessarily produce more energy than the vehicle battery 403 can hold. However, in some instances a vehicle battery 403 can only take on so much energy at one instant.

In one embodiment, the regulator 402 will let through the energy that the vehicle battery 403 can accept. The remaining energy will be transferred to a capacitor 404 electrically coupled to the regulator 402. The capacitor 404 will store energy until such a time as the vehicle battery 403 can accept more energy than produced by the electrical generation device 401. At this time, the regulator 402 will draw additional power from the capacitor 404 and send it to the vehicle battery 403. This will help ensure as much energy as possible is used by the system.

The vehicle battery 403 is then electrically coupled to the vehicle systems 405. In one embodiment the vehicle is an electric vehicle. Using this device, the electric vehicle can use kinetic energy to generate additional battery life and thus additional mileage. In other embodiments the car systems 405 include items such as radios, lights, and other typical vehicle systems.

Figure 5:
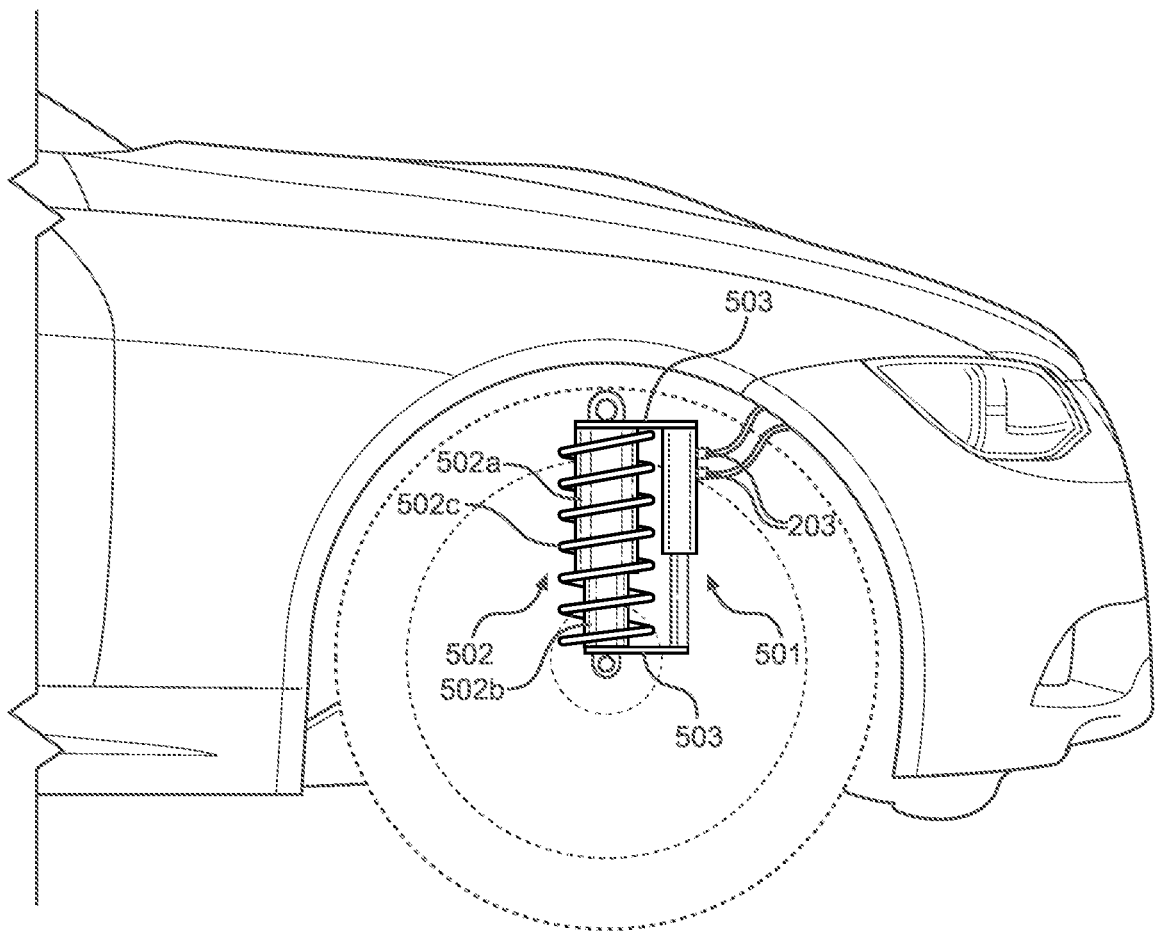
FIG. 5 shows a perspective view an embodiment of the kinetic energy shock absorber installed in a vehicle.

Referring now to FIG. 5, there is shown a perspective view an embodiment of the kinetic energy shock absorber installed in a vehicle. In one embodiment, the kinetic energy shock absorber 501 is not a replacement for a vehicle shock 502. In one embodiment, the vehicle shock 502 is installed within the vehicle as normal. In most embodiments, a vehicle shock will have a sleeve 502a and a piston 502b. In the shown embodiment the vehicle shock 502 further has a coil spring 502c. However, other models of vehicle shocks will still work with the kinetic energy shock absorber 501.

The kinetic energy shock absorber 501 is connected to the existing vehicle shock 502. When the vehicle shock 502 is as described above, the sleeve 502a and the piston 502b of the kinetic energy shock absorber 501 are installed in a matching manner. In one embodiment, prongs 503 are added to the vehicle shock 502. The prongs 503 will then be welded to the kinetic energy shock absorber 501. In another embodiment, the kinetic energy shock absorber 501 has the protrusions as described in FIG. 1. In these embodiments, other fasteners are used to secure the kinetic energy shock absorber 501 to the vehicle shock 502 via the apertures through the protrusions.

Once the kinetic energy shock absorber 501 is secured to the vehicle shock 502, the electrical connection 203 as described in FIG. 2 and FIG. 3 is used to connect the kinetic energy shock absorber 501 to the vehicle electrical systems as described in FIG. 4.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. A kinetic energy shock absorber, comprising:
   a sleeve having a closed end, an open end, and an exterior;
   a piston fitted directly within the sleeve, the piston having a closed end and an exterior;
   a coil spring located about the exterior of the sleeve and the piston;
   wherein the closed end of the sleeve has a protrusion attached to the closed end of the piston and the sleeve protrusion has an aperture located therethrough;

wherein the closed end of the piston has a protrusion and the piston protrusion has an aperture therein;
wherein the piston generates electric energy when it enters the sleeve via an electric generation device;
a regulator electrically coupled to the electric generation device;
wherein the coil spring will provide resistance;
wherein the regulator is electrically coupled to a battery bank of a motor vehicle and a capacitor;
wherein the regulator is configured to prioritize energy transfer to the battery bank, such that overflow energy is directed to the capacitor;
wherein the electric generation device includes a plurality of copper wiring that lines an interior of the sleeve;
wherein the kinetic energy shock absorber is a monotube type shock absorber; and
wherein the electric generation device is a piezoelectric device;
further comprising an electric coupling located on the exterior of the sleeve;
wherein the electric coupling is attached to the electric generation device.

2. The kinetic energy shock absorber of claim 1, wherein the sleeve and the piston create an air shock.

3. A kinetic energy shock absorber, comprising:
a sleeve having a closed end and an open end;
a piston fitted directly within the sleeve, the piston having a closed end;
wherein the closed end of the sleeve has a protrusion attached to the closed end of the piston and the sleeve protrusion has an aperture located therethrough;
wherein the closed end of the piston has a protrusion and the piston protrusion has an aperture therein;
wherein the piston generates electric energy when it enters the sleeve via an electric generation device;
a first prong extending from an upper end of an existing shock of a motor vehicle and the first prong is affixed to the closed end of the sleeve;
a second prong extending from a lower end of the existing shock and the second prong is affixed to the closed end of the piston;
wherein the second prong translates movement of the existing shock to the kinetic energy shock absorber; and
wherein the electric generation device includes a copper wiring that lines an interior of the sleeve;
wherein the electric generation device is a piezoelectric device;
wherein the kinetic energy shock absorber is a monotube type shock absorber;
further comprising an electric coupling located on an exterior of the sleeve;
wherein the electric coupling is attached to the electric generation device; and
further comprising a regulator electrically coupled to the electric generation device.

4. The kinetic energy shock absorber of claim 3, wherein the electric generation device is electrically coupled to a battery bank of a motor vehicle.

5. A kinetic energy shock absorber, consisting of:
a sleeve having a closed end, an open end, and an exterior;
a piston fitted directly within the sleeve, the piston having a closed end and an exterior;
a coil spring located about the exterior of the sleeve and the piston;
wherein the closed end of the sleeve has a protrusion attached to the closed end of the piston and the sleeve protrusion has an aperture located therethrough;
wherein the closed end of the piston has a protrusion and the piston protrusion has an aperture therein;
wherein the piston generates electric energy when it enters the sleeve via an electric generation device;
a regulator electrically coupled to the electric generation device;
wherein the coil spring will provide resistance;
wherein the regulator is electrically coupled to a battery bank of a motor vehicle and a capacitor;
wherein the regulator is configured to prioritize energy transfer to the battery bank, such that overflow energy is directed to the capacitor;
wherein the electric generation device includes a plurality of copper wiring that lines an interior of the sleeve;
wherein the kinetic energy shock absorber is a monotube type shock absorber; and
wherein the electric generation device is a piezoelectric device;
further comprising an electric coupling located on the exterior of the sleeve, wherein the electric coupling is attached to the electric generation device.

* * * * *